United States Patent [19]

Moed

[11] 4,110,562

[45] Aug. 29, 1978

[54] SERVICE GENERATOR FOR GENERATING A PLURALITY OF TONES

[75] Inventor: Johannes A. R. Moed, San Jose, Calif.

[73] Assignee: TRW Inc., Los Angeles, Calif.

[21] Appl. No.: 762,810

[22] Filed: Jan. 26, 1977

[51] Int. Cl.² ............................................. H04J 3/12
[52] U.S. Cl. ............................................. 179/15 BY
[58] Field of Search .......... 179/15 AT, 15 BY, 84 VF

[56] References Cited

U.S. PATENT DOCUMENTS

| | | | |
|---|---|---|---|
| 3,801,746 | 4/1974 | Buchner | 179/15 BY |
| 3,870,826 | 3/1975 | Carbrey | 179/15 BY |
| 3,959,596 | 5/1976 | Bojanek | 179/15 AQ |
| 3,985,965 | 10/1976 | Field | 179/15 BY |

Primary Examiner—David L. Stewart
Attorney, Agent, or Firm—Flehr, Hohbach, Test, Albritton & Herbert

[57] ABSTRACT

A service generator and method for generating a plurality of tones for use in a telephone system operating in time frames each consisting of a plurality of time slots. The service generator includes tone generators for generating each time frame pulse code modulated tone samples for a plurality of tones, a tone multiplexer for multiplexing the tone samples onto a common bus each time frame, matrix means connected to the common bus for connecting selected ones of the tone samples to selected time slots in each frame, and control means connected to control the matrix means for specifying the selected ones of the tone samples and for specifying the specified time slots.

17 Claims, 14 Drawing Figures

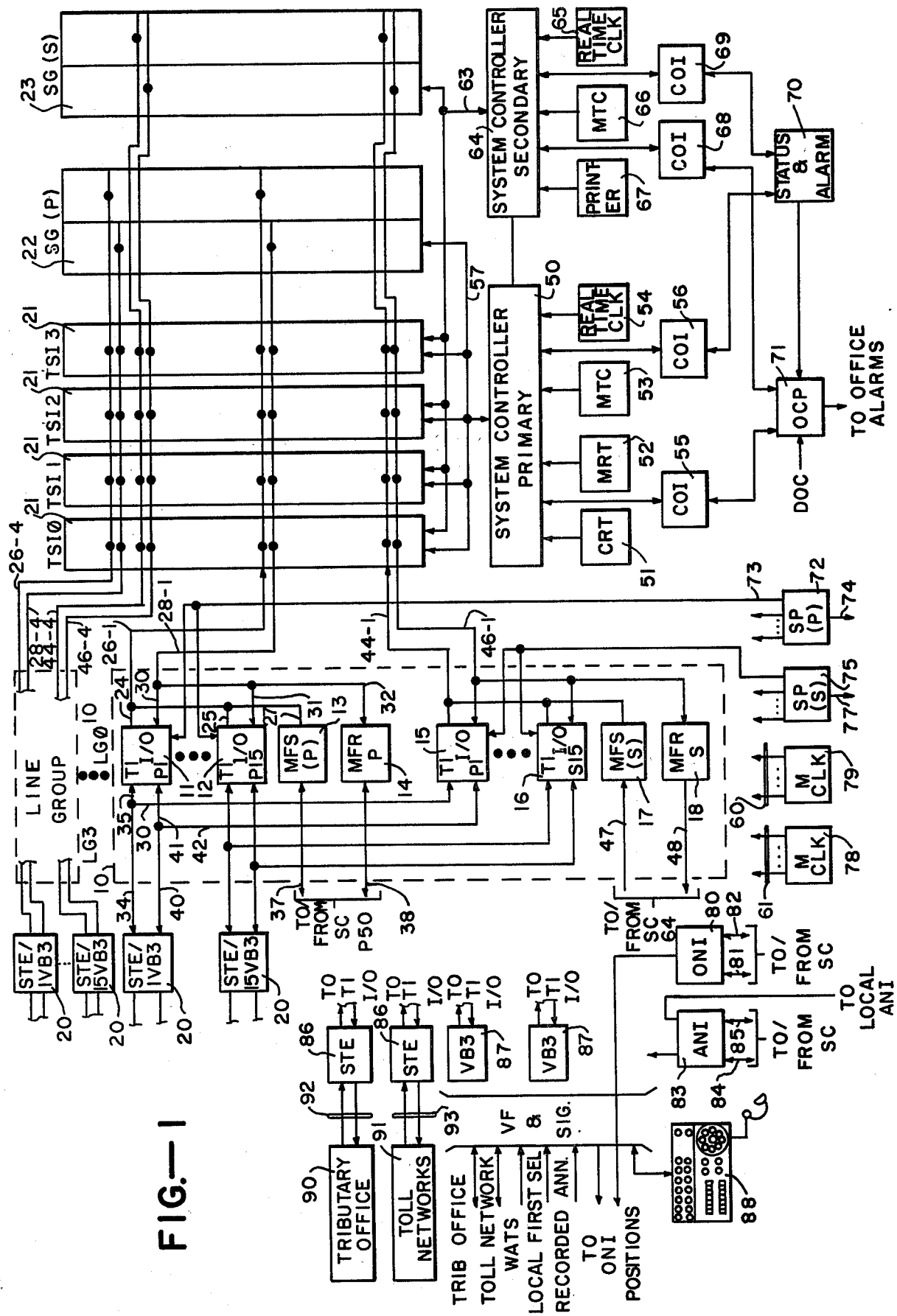
FIG.—1

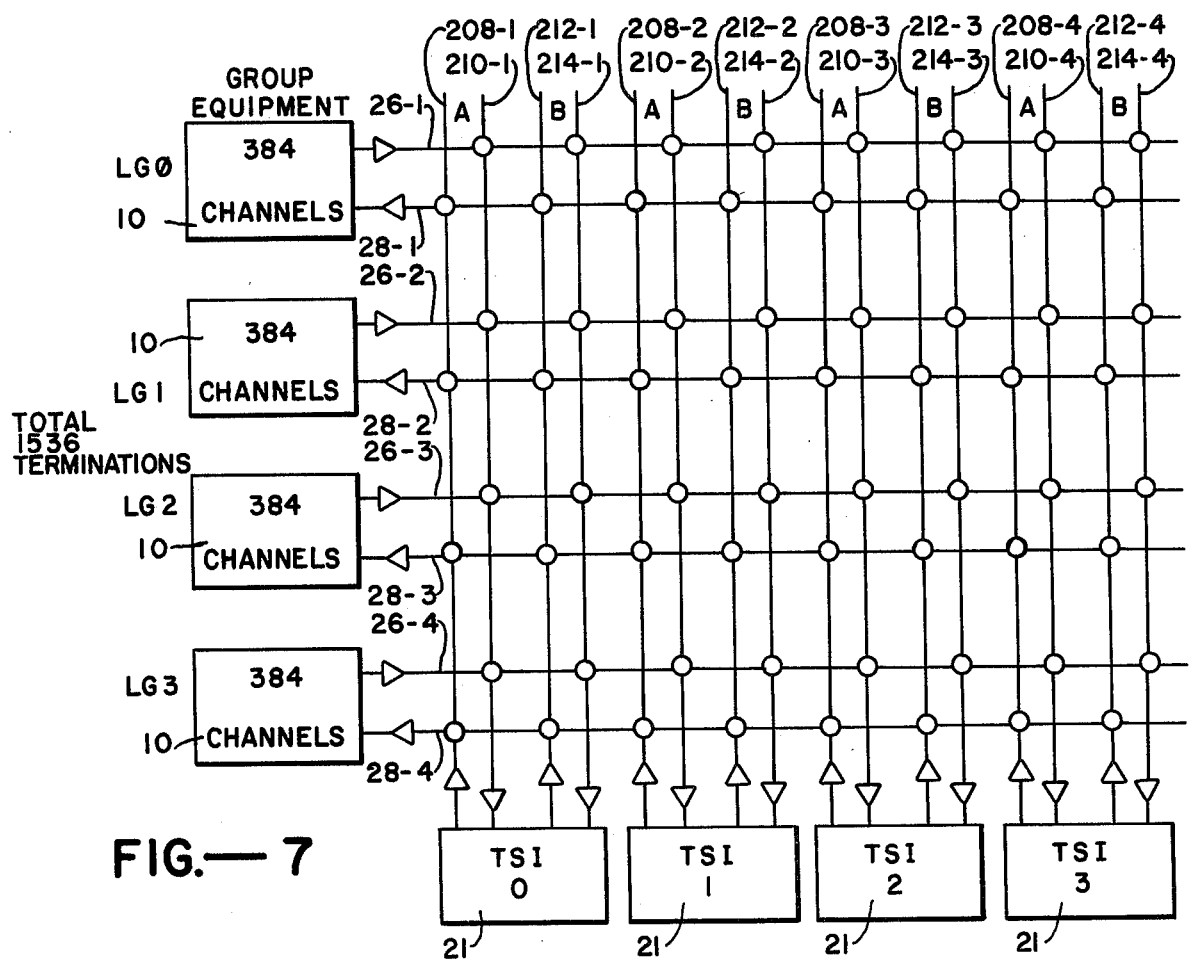
FIG.—7
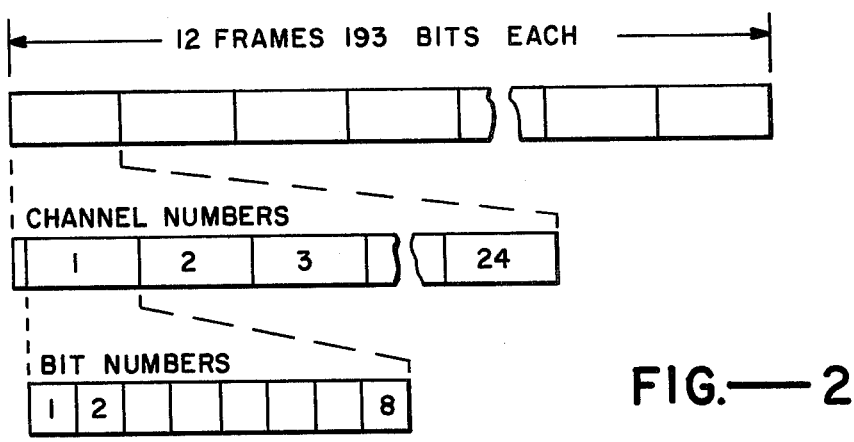
FIG.—2
| FRAME NUMBER | 1 | 2 | 3 | 4 | 5 | 6* | 7 | 8 | 9 | 10 | 11* | 12 |
|---|---|---|---|---|---|---|---|---|---|---|---|---|
| FRAME BIT | 1 | 0 | 0 | 0 | 1 | 1 | 0 | 1 | 1 | 1 | 0 | 0 |
FIG.—3

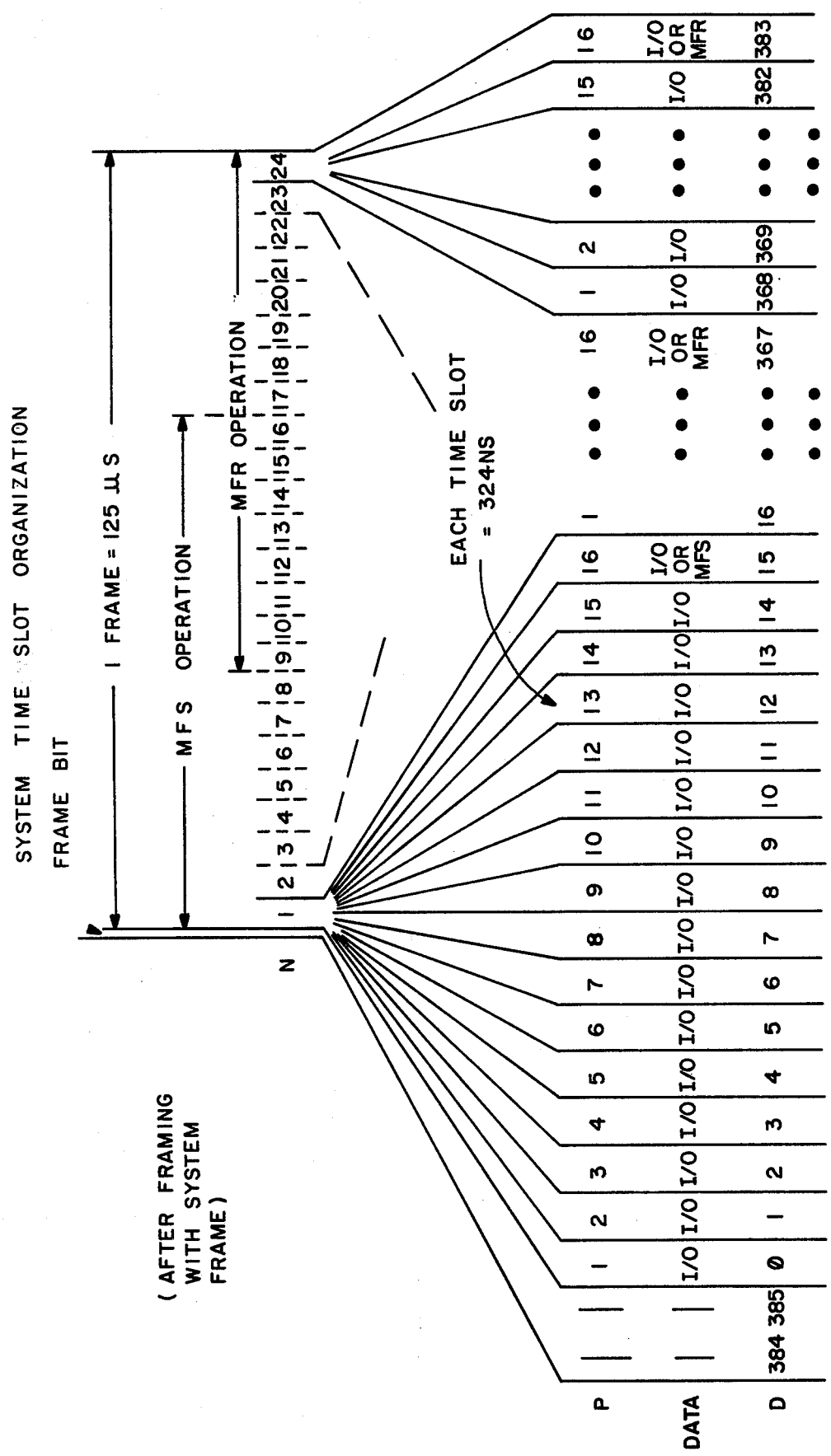
FIG.—4

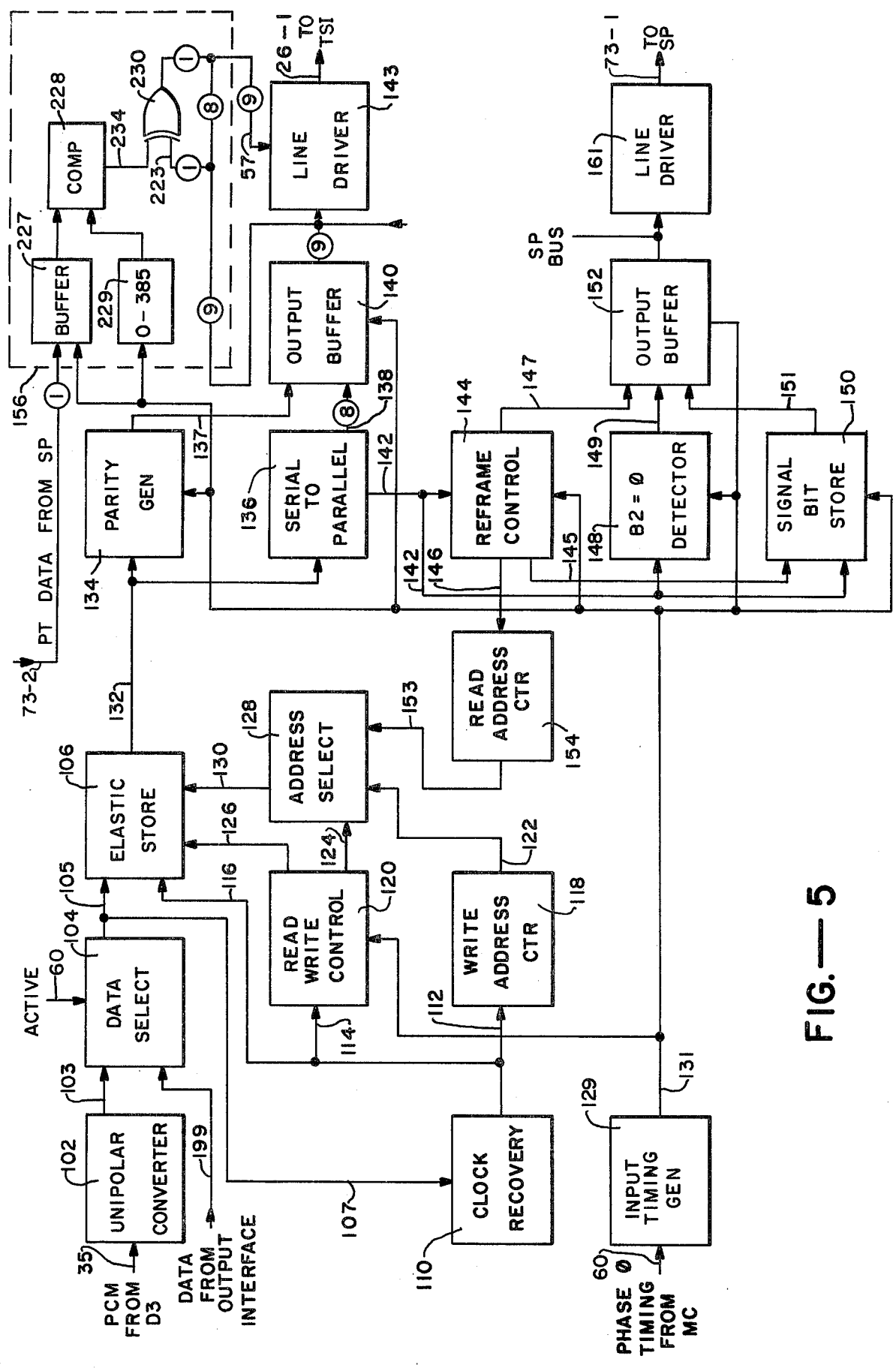
FIG.—5

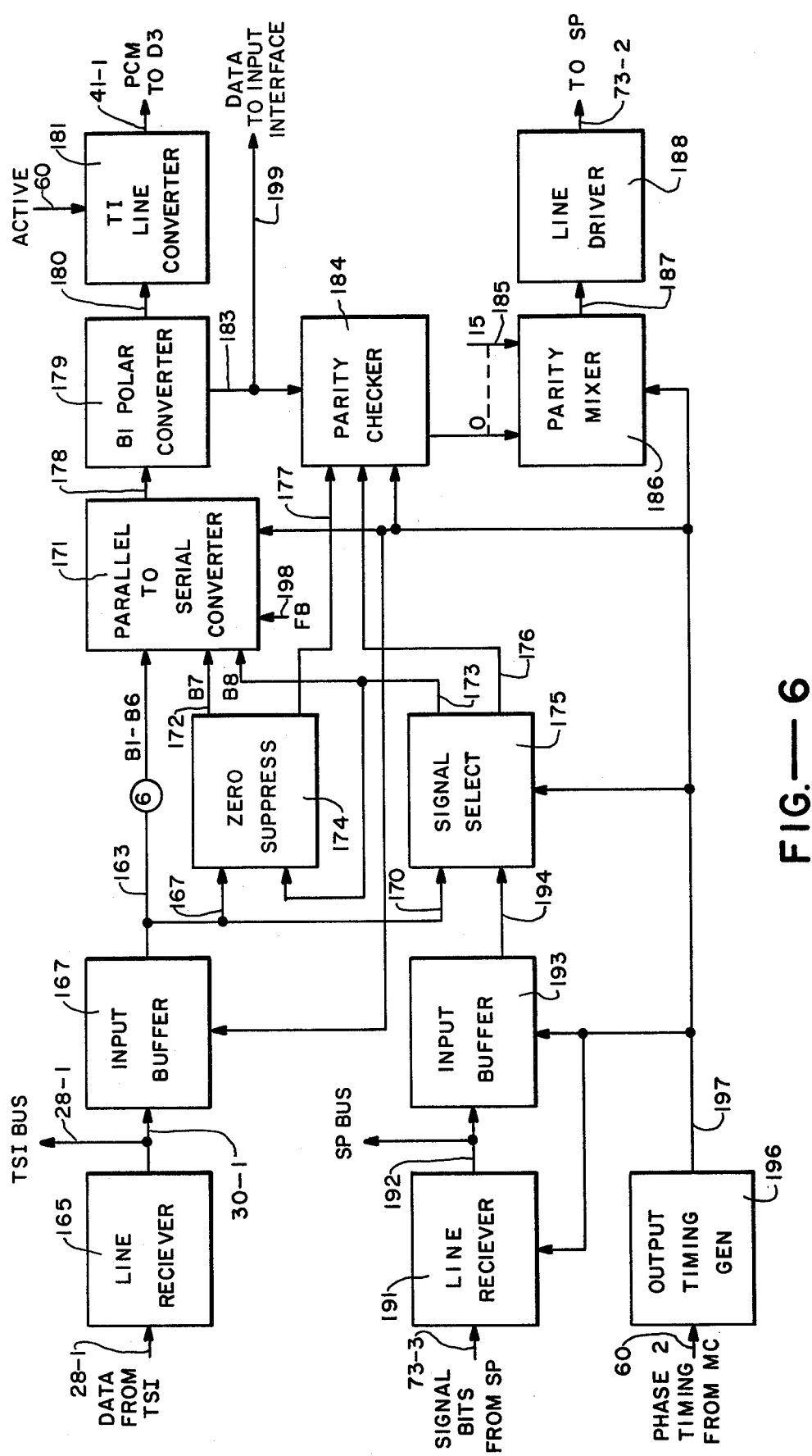
FIG.—6

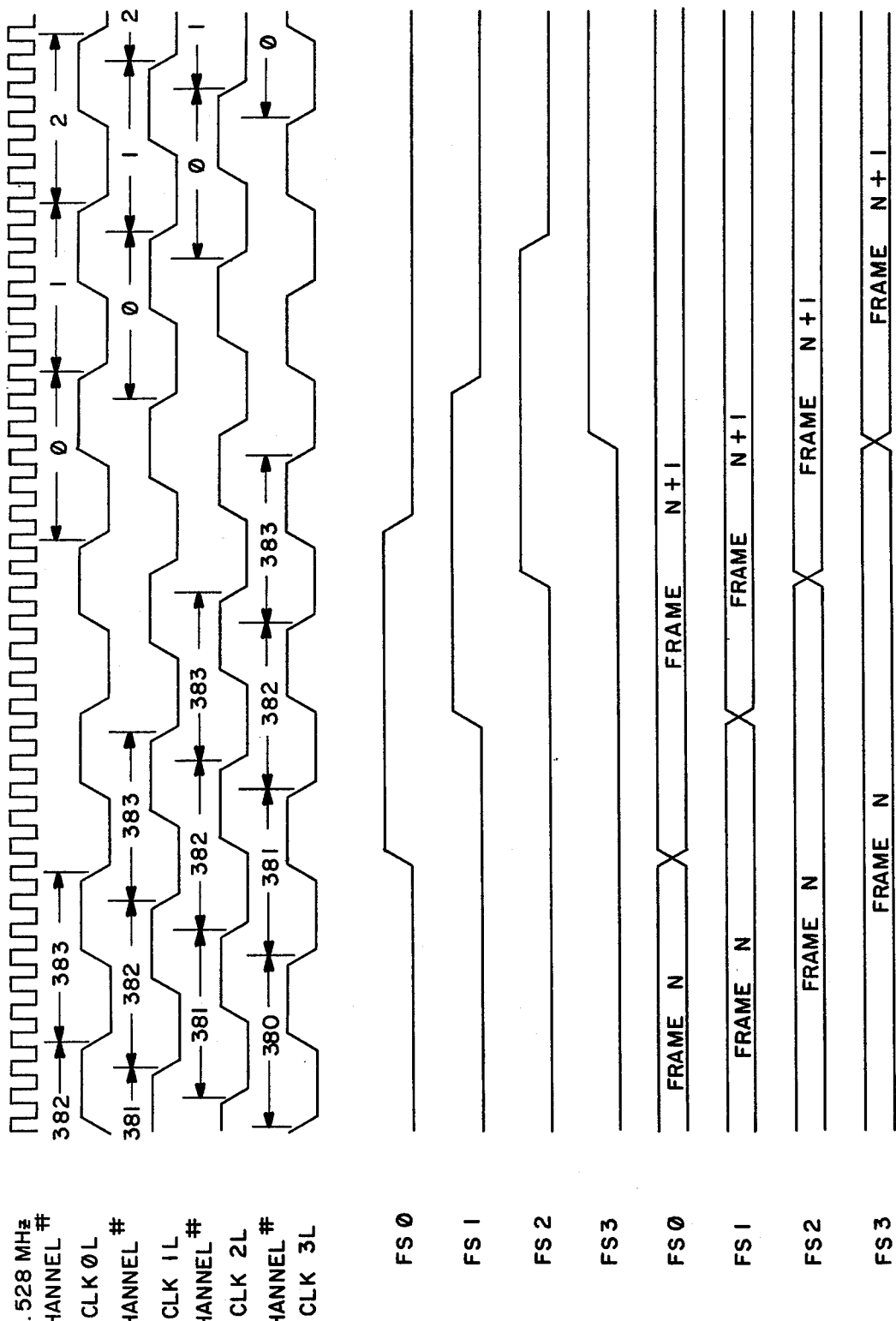
FIG.—8

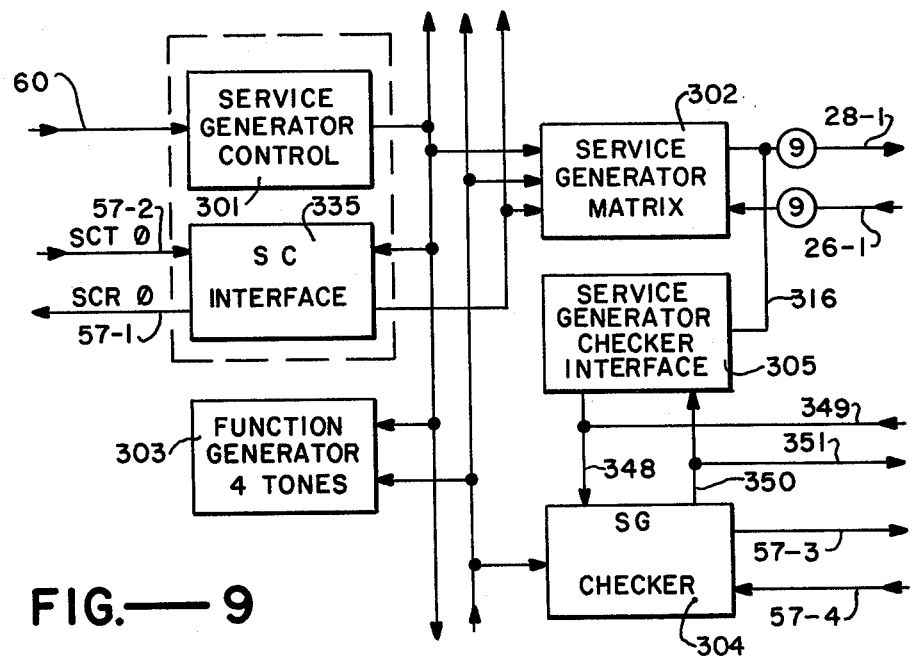
FIG.—9
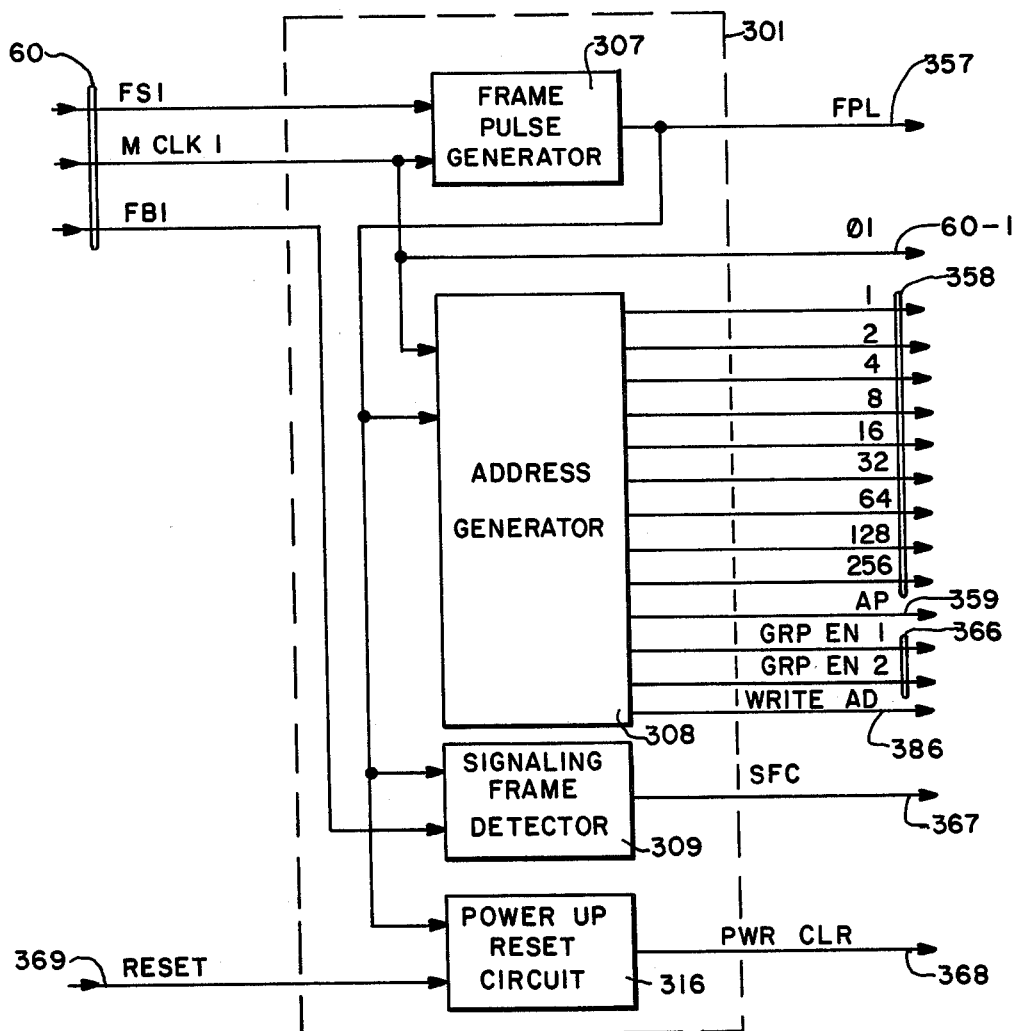
FIG.—10

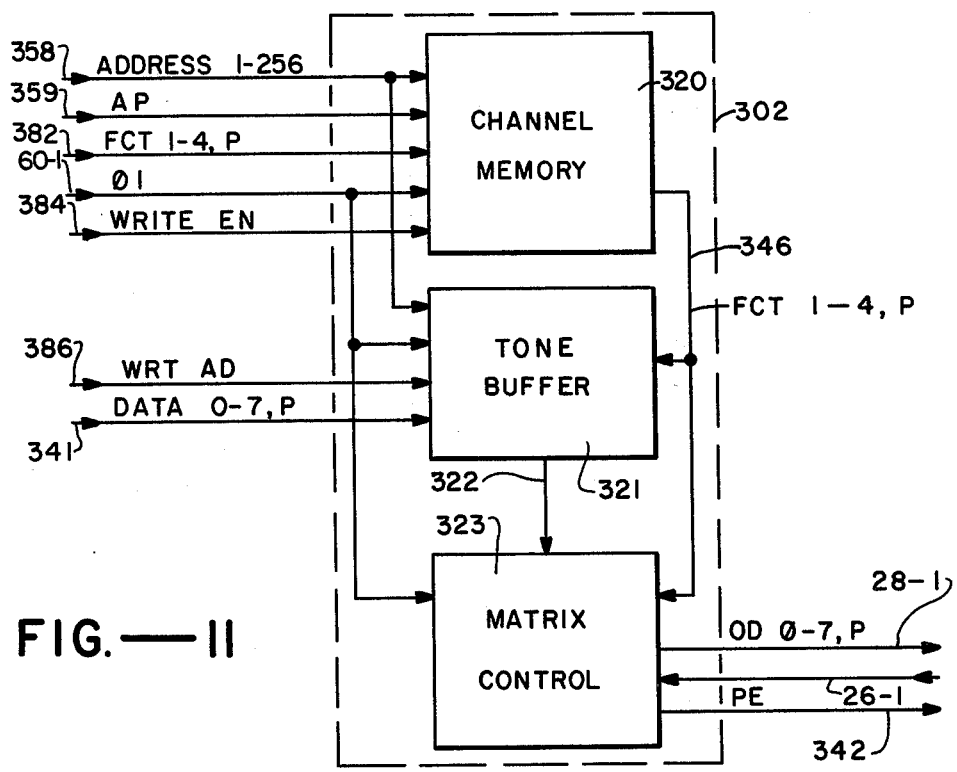
FIG.—11
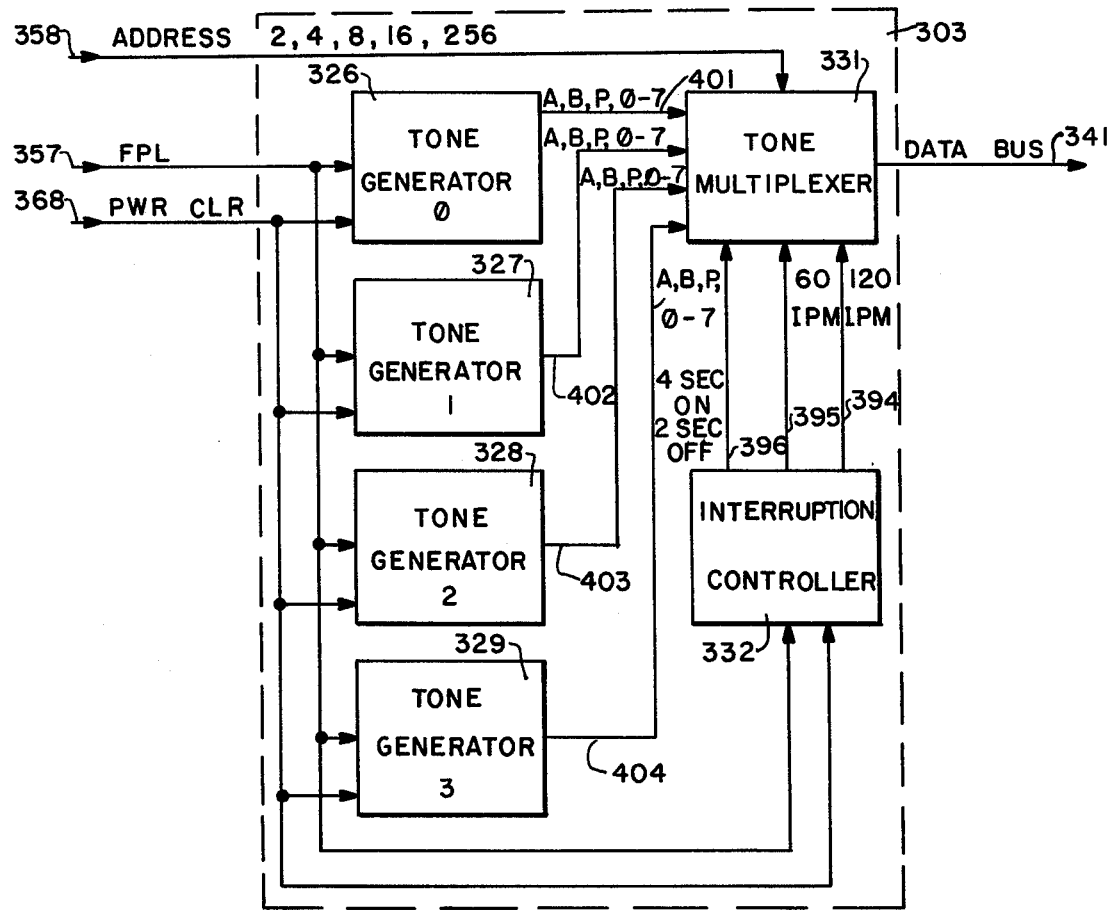
FIG.—12

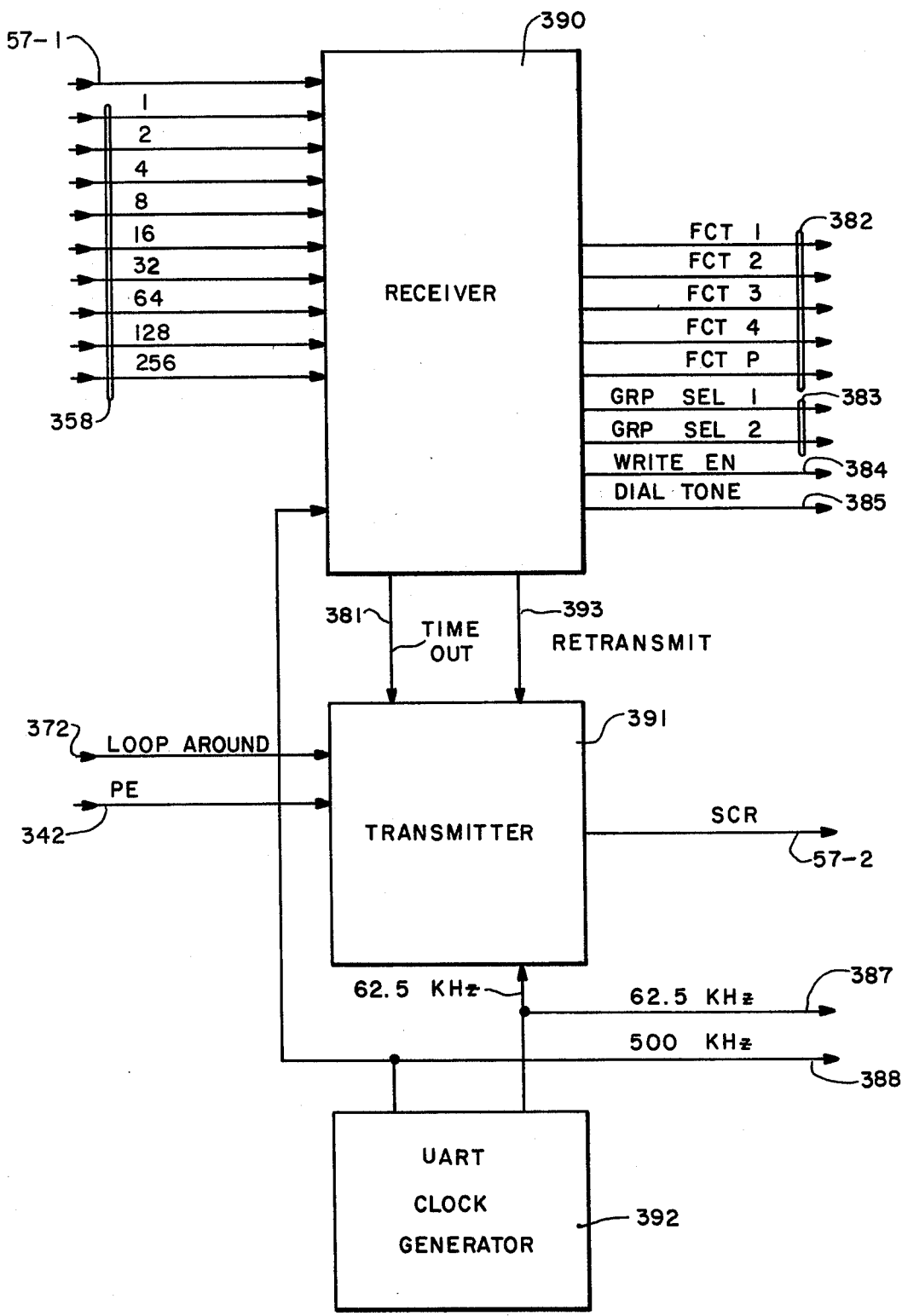
FIG.—13

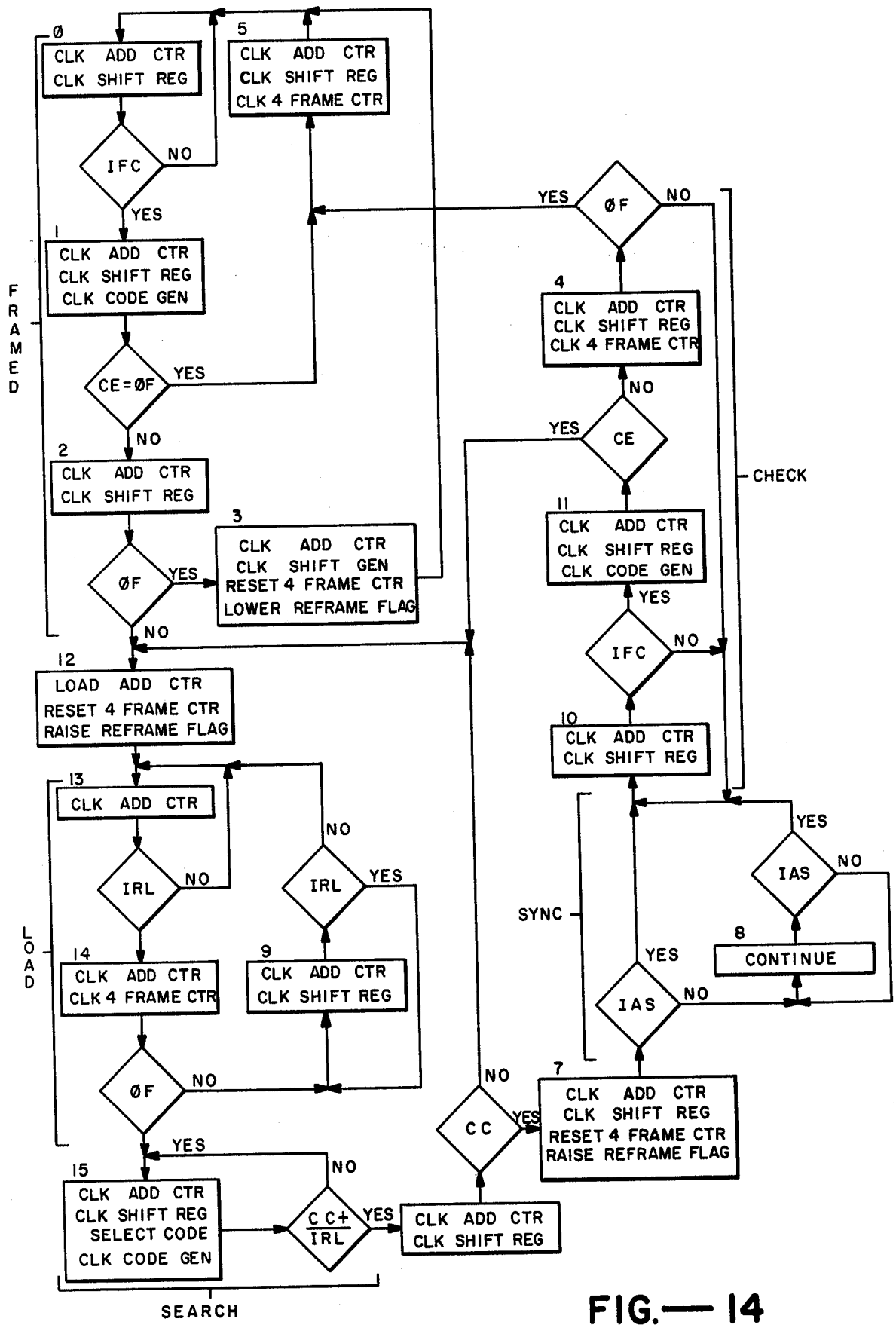
FIG.—14

SERVICE GENERATOR FOR GENERATING A PLURALITY OF TONES

CROSS REFERENCE TO RELATED APPLICATIONS

1. INTEGRATED MESSAGE ACCOUNTING SYSTEM, Ser. No. 781,348, filed Mar. 25, 1977, invented by John C. McDonald and James R. Baichtal, and assigned to the same assignee as the present invention.

2. TIME SLOT INTERCHANGER, Ser. No. 762,811, filed Jan. 26, 1977, now U.S. Pat. No. 4,071,703, issued Jan. 31, 1978 invented by Craig Schaffter, and assigned to the same assignee as the present invention.

3. REGISTER/SENDER [PER CHANNEL] Ser. No. 762,801, filed Jan. 26, 1977, invented by Johannes R. Moed, and assigned to the same assignee as the present invention.

4. MULTIFREQUENCY SENDER/RECEIVER IN A MULTI-TIME SLOT DIGITAL DATA STREAM, Ser. No. 762,809, filed Jan. 26, 1977, and invented by Bradley A. Helliwell and James R. Baichtal, and assigned to the same assignee as the present invention.

5. A DOUBLE REDUNDANT PROCESSOR [TWO CHIPS IN PARALLEL WHICH RUN SYNCHRONOUSLY] Ser. No. 781,437, filed Mar. 25, 1977, invented by John C. McDonald and James R. Baichtal, and assigned to the same assignee as the present invention.

6. SERVICE GENERATOR CHECKING APPARATUS AND METHOD, Ser. No. 762,808, filed Jan. 26, 1977, now U.S. Pat. No. 4,071,704, issued Jan. 31, 1978 invented by Johannes R. Moed, and assigned to the same assignee as the present invention.

7. PATH TEST APPARATUS AND METHOD, Ser. No. 762,934, filed Jan. 26, 1977, invented by James R. Baichtal and assigned to the same assignee as the present invention.

BACKGROUND OF THE INVENTION

The present invention relates to a telephone system operating in time frames each consisting of a plurality of time slots and more particularly to a service generator for generating a plurality of tones.

The signals which are typically required in a telephone system are the ring back tone, dial tone, and trunk busy tone. In addition, other tones are required which are used internally by the telephone system. With the advent of electronic state design and integrated circuits, telephone switching systems are capable of switching pulse code modulated (PCM) digitally encoded signals at an extremely high rate while incorporating a small size.

PCM signals in a telephone switching system enable a multiplicity of conversations to be transmitted over a two wire digitally multiplexed line commonly known as a T1 trunk line. A T1 trunk line multiplexed with other T1 lines forms what is known as a line group. The multiplexed PCM data from the line group is then applied to a time slot interchanger for switching from one time slot or channel of the line group to another time slot or channel of another line group through what is known as space-time-space-division switching techniques.

In an electric switching system for PCM data, the system must be capable of connecting one of several tones to any of the channel time slots. The tones must be digitally synthesized in PCM format to be compatible with the input/output formats. In addition, the digital tones must be compatible with telephone system specifications which may allow only a certain variation from the tone. For example, the American Telephone and Telepraph Company system specifications only allow ±0.5% variation from a particular tone.

In the prior art, in order to generate, for example, multifrequency tones, those systems have utilized a memory containing in PCM format a representation of one of the tone pairs for a particular digit. Multifrequency tones are particularly adaptable for tone generation because each multifrequency tone can be represented by 20 PCM samples to accurately represent the particular digit. This is because of waveform symmetry for each multifrequency tone pair. All even quarter periods of the waveform are mirror images of the corresponding odd quarter periods. Also, every half period of the waveform is inverted. In prior art systems, the tones are read out of the multifrequency tone memory cyclically by a 21 state up/down counter. The outputs of the memory are then appropriately complemented and inverted by necessary gating circuitry, depending upon the particular quarter period of the waveform.

In order to generate such tones as dial tone, ring back tone, or trunk busy tone, prior art systems have generally not been able to accurately represent each of the tones with just 20 samples. For example, to accurately represent ring back tone in PCM format requires 200 PCM samples. Similarly, a trunk busy tone requires at least 233 samples. Techniques available in the prior art as described above generally cannot accommodate such requirements.

In accordance with the above background, there is a need for a service generator capable of digitally synthesizing in PCM format those tones, such as ring back, dial, trunk busy, and internal, used in a telephone system compatible with system specifications (e.g., frequency, data format, and other similar characteristics) of currently installed equipment.

SUMMARY OF THE INVENTION

The present invention relates to a service generator and method for generating a plurality of tones in a telephone system operating in time frames each consisting of a plurality of time slots.

The service generator includes tone generators for generating each time frame pulse code modulated samples for a plurality of tones. Also included are tone multiplexer means for multiplexing the tone samples onto a common bus each time frame. Matrix means, connected to the common bus, are provided for connecting selected ones of the tone samples to selected time slots in each frame. The service generator also includes control means connected to control the matrix means for specifying the selected ones of the tone samples and for specifying the selected time slots.

In accordance with one feature of the invention, the matrix means includes tone buffer means for storing, during each time frame, a pulse code modulated sample from the tone multiplexer means for each of the plurality of tones, and a channel memory for storing at locations corresponding to the selected time slots the selected ones of the tones. The control means includes an address generator for addressing the channel memory whereby the channel memory addresses the line buffer means at the location where the specified tone is stored.

In accordance with the above summary, the present invention achieves the objective of providing an improved service generator and method for generating a plurality of tones in a telephone system.

Additional objects and features of the invention will appear from the description in which the preferred embodiments have been set forth in detail in conjunction with the drawings.

DESCRIPTION OF THE DRAWINGS

FIG. 1 is a block diagram of an integrated message accounting system in accordance with the present invention.

FIG. 2 is a representation of the time slot frame structure employed within a multiframe format.

FIG. 3 shows the frame bit code utilized by the integrated message accounting system of FIG. 1.

FIG. 4 shows the system time slot organization of the integrated message accounting system.

FIG. 5 shows a block diagram of a T1 input portion of the I/O interface of FIG. 1 which is a portion of the FIG. 1 system.

FIG. 6 shows a block diagram of a T1 output portion of the I/O interface of FIG. 1 which forms part of the FIG. 1 system.

FIG. 7 shows a time slot interchanger which forms part of the FIG. 1 system.

FIG. 8 is a timing diagram for the system master clock of FIG. 1.

FIG. 9 shows a block diagram for the Service Generator which forms a portion of the FIG. 1 system.

FIG. 10 shows a block diagram for the Service Generator Control which forms a portion of FIG. 9.

FIG. 11 shows a block diagram for the Service Generator Matrix which forms a portion of FIG. 9.

FIG. 12 shows a block diagram for the Function Generators which form a portion of FIG. 9.

FIG. 13 shows a block diagram of the System Controller Interface which forms a portion of FIG. 9.

FIG. 14 shows an exemplary flow chart for describing the operation of the reframe control circuit which forms a portion of FIG. 5.

DETAILED DESCRIPTION OF THE INVENTION

Referring to FIG. 1, the integrated message accounting system (IMAS) is seen in block diagram form. The IMAS can be used at class 4P toll points to process 1+ toll calls originating in class 5 offices, local calls, and other similar uses. It may be used as a LAMA (Local Automatic Message Accounting) system or as a CAMA (Centralized Automatic Message Accounting) system.

The basic functions of the IMAS are to provide recording of calls on magnetic tape, alternate routing for originating traffic, ONI operation, traffic monitoring reports, tandem routing for completing traffic, and WATS service (wide area telephone service). Further details of the IMAS are described in the above-referenced application entitled "Integrated Message Accounting System."

In FIG. 1, the span terminating equipment (STE) 86 is well-known equipment which functions to transmit, receive, terminate, monitor status of, or loop back the PCM bit streams of T1 lines used as digital trunks in connection with the IMAS.

The VB3 voice bank 87 is well-known equipment which provides time division multiplexing-demultiplexing, PCM encoding-decoding and terminal failure group alarm functions between 24 telephone circuits (VF and signaling) and a 1.544 MB/S bipolar pulse stream in D3 format. As seen in FIG. 1, VB3 87 provides appropriate interfacing with tributary offices, toll network, WATS service, recorded announcements, local first selectors, and Operator Number Identification (ONI) positions. The pulse stream is applied to a T1 input/output interface in the IMAS digital switch. Individual trunks (channel units) are chosen and configured appropriately for each application.

In FIG. 2, the PCM data format in the STE and VB3 equipment is compatible with the American Telephone and Telegraph Company's D3 channel bank, the operation of which is well known. With a sampling frequency of 8,000 Hz for encoding PCM data, one timing frame equals 125 microseconds with 24 time slots per frame per T1 line. Each channel of information is in the form of 8 bit channel words. A framing bit is added every 24 channels to form and define a frame. Each frame of 125 microseconds equals one frame bit plus the 24 time slots of 8 bits each and therefore there are 193 bits per frame for a D3 channel bank.

In FIG. 3, the frame bit occurs once at the start of each frame. It contains a framing code that takes 12 frames to repeat.

In each time slot there is an 8 bit speech code to digitally represent a quantized value of a particular portion of an analog signal. Once each six frames the eighth bit of each time slot carries a signaling bit to indicate on-hook or off-hook status of that particular channel or time slot.

In PCM systems like that of FIG. 1, quantizing a message signal by certain discrete levels or steps inherently introduces an initial error in the amplitude of the samples, giving rise to quantization noise. Quantization noise can be reduced by the use of nonuniform spacing of levels, to provide smaller steps for weaker signals and coarser quantization near the peak of large signals. The $\mu$-255 companding law utilizes this concept of encoding PCM data in which the coding magnitude range is divided into 8 segments, and 16 levels are equally spaced within each of the 8 segments. From one segment to the next higher, the level spacing (step size) increases by a factor of 2. In the 8 bit code word representing any sample, the first bit gives the sign, the next 3 bits describe which of the 8 segments contain the sample, and the last 4 bits specify the nearest of the 16 possible levels within the segment.

In FIG. 1, the unit 20 is either a STE 86 or a VB3 87 unit as previously described. Data from STE/VB3 unit 20 is applied to both the primary and secondary interfaces of a line group 10. For example, data is input to T1 I/O primary interface 11 and the secondary I/O interface 15 via buses 34, 35, and 34, 36, respectively. Data is output from T1 I/O interfaces 11, 15 to STE/VB3 unit 20 via buses 41, 40 and 42, 40, respectively.

As seen in FIG. 1, primary and secondary interface redundancy is employed in all major subsystems in the IMAS to prevent a single point failure which could cause the system to go down. Faulty subsystems are automatically switched off line to provide minimum interruption to service. Further details of the subsystem redundancy are described in the above-referenced application entitled "Integrated Message Accounting System."

A line group 10 interfaces any T1 line pair such as lines 34 and 40 with four Time slot Interchangers (TSI) 21 designated TSI $\phi$-3. A primary T1 I/O Interface also interfaces the optional primary multifrequency sender (MFS) 13 and receiver (MFR) 14 with the TSI 21. A primary T1 I/O interface such as interface 11 accepts bipolar PCM data from a T1 line (34, 40) carrying information in D3 format (standard D3 decode transfer characteristic). A secondary (redundant) T1 I/O Interface such as Interface 15 also interfaces any T1 line pair such as lines 34, 40 with the TSI 21. Interface 15 also interfaces the secondary MFS 17 and MFR 14 with TSI 21.

Incoming data from a unit 20 is stored and synchronized by the I/O Interface such as interface 11 to the IMAS system frame. Data is converted by each I/O interface to 9 bit parallel (includes parity bit) and sent to the time slot interchanger (TSI) 21. Carrier group alarm (CGA) detection (B2=0) and signal bit recovery (Bit 8 of 6th and 12th frames) is also accomplished. Error signals and signal bits are sent to the primary signal processor (SP) 72 or secondary SP 75 for further analysis.

It is possible to operate 16 of these T1 I/O interfaces for each primary and secondary subsystem per line group. Each I/O interface accommodates one T1 line or one VB3 voice bank. Up to four line groups per system may be used. Further discussions of the various primary and secondary subsystems will be limited to the primary subsystem, although it will be understood that the discussion would apply with equal effect to the secondary subsystem.

A line group organizes the voice frequency data from 16 T1 lines or 15 T1 lines and the MFS onto a 384 time slot data bus to the TSI's (TSI$\phi$-TSI3).

Referring to FIG. 4, one frame is equivalent to 125 microseconds or 193 bits. The frames recur at the 8KHz sampling frequency. There are 24 D3 channel numbers as indicated by N, and there are a total of 384 time slots of 324 nanoseconds each, with an additional two time slots for the frame bit. FIG. 4 shows how time slots are organized with respect to the incoming frame. The first 16 time slots are constructed of data from channel one of the 16 incoming frames. The next 16 times are from channel 2 and so on. Each T1 I/O interface is allocated to one of 16 time slots for each D3 channel. 16 T1 lines are each input to the respective T1 line I/O interface and multiplexed to time slots 0-15. P indicates the particular line group interface accessed during a channel number. For example, during channel number one, P1 would indicate primary I/O interface 11 and secondary I/O interface 15 of FIG. 1 is accessed. P15 would indicate primary I/O interface 12 and secondary I/O interface 16 are accessed. P16 would indicate primary multifrequency sender 13 and secondary sender 17 of FIG. 1 are accessed. If the line group did not employ a multifrequency sender and receiver, P16 would indicate accessing another I/O interface. During channel 24, P16 would indicate the primary MF receiver 14 and secondary MF receiver 18 are accessed. The D of FIG. 4 indicates the decimal time slot for the line group from 0-385. D3 channels 1-8 are assigned to the MF sender. D3 channels 17-24 are assigned to the MF receiver and D3 channels 9-16 are assigned to either MFS or MFR, dependent upon traffic conditions.

In FIG. 1, the IMAS digital switch comprises line groups 0-3 and TSI 0-3.

Referring to FIG. 1, the TSI 0-3 switch channel time slot data from any of the four line groups to any other channel time slot of any other of the four line groups. For example, data from line group 0 could be sent via bus 26-1 to TSI 0 and switched out bus 28-4 to line group 3. The TSI's receive channel time slot data (8 bits plus parity). When it is available from the line group data bus, the TSI's hold it until the proper time for output in the next frame and transmit the data to the line group data for output. The TSI contains control and data memory for all time slots. The TSI's communicate with both the primary and secondary system controllers (SC) 50, 64 via bus 57, 63. Further details of the digital switch are described in the above-referenced application entitled "Time Slot Interchanger."

In FIG. 1, the primary and secondary service generators (SG) 22, 23 provide capability to connect one of several standard tones in PCM format to any of the channel time slots. These tones include 1,000 Hz, 120 IPM busy, 60 IPM busy, dial tone, ring back tone and internal tones for the IMAS. The primary and secondary SG 22, 23 receive control signals from the respective system controller (SC) 50, 64. Further details of the service generator are described subsequently.

The primary and secondary signal processors (SP) 72, 75 monitor all the input channels of the IMAS for changes of state and dial digits. Each time a channel is seized or released, or a digit is dialed, a message is sent to the respective SC 50, 64 via buses 74, 77, containing the channel number and the event. All the information needed to determine the changes of state or dial digits is time division multiplexed over several leads originating from the line group.

The SP 72, 75 also have the capability to seize or release channels or dial digits on these channels. Frames 6 and 12 are signaling frames. During these frames, the least significant bit of the 8 PCM byte is replaced with a signaling bit. Frame 6 is used for an A signaling bit and frame 12 is used for a B signaling bit. The signal processor uses the A signaling bit for seizure, release and dial digit detection. The B signaling bit is used for state change detection only. Further details of the signal processor are described in the above-referenced application entitled "Register/Sender per Channel."

In FIG. 1, the primary and secondary system Master Clock 79, 78 is a conventional device for generating all basic clock signals used by the IMAS. The clock generates 4 clock signals MCLK$\phi$-MCLK3 all of which are 3.088 MHz square waves, but each one is phase shifted by 270 ns nominal. The purpose of this phase shifting is to allow for propagation delay of data as it is routed through the different subsystems contained in the IMAS.

Referring to FIG. 8, the basic frequency of the system master clock is a crystal generated 18.528 MHz. The basic frequency of the system master clock is divided down to the 3.088 MHz square wave.

Master frame pulses FS$\phi$-FS3 generate a 648 ns pulse every 125 us and are used to mark the start of a new frame. FS$\phi$-FS3 are primarily used by subsystems to synchronize their address generators.

The master frame bit signal FB$\phi$-FB3 generate a repeating pattern of serial bits. The pattern repeats every 12 frames and the bits can be decoded to identify each of the 12 frames as seen in FIG. 3.

Again referring to FIG. 1, in addition to the clock signals of FIG. 8 originating from the master clock, an "Active" signal originates from the system controller 50, 64 of FIG. 1 to inform some of the IMAS subsystems that they are on line.

In FIG. 1 the operator number identification subsystem (ONI 80) provides a control interface between the IMAS and ONI operator positions for serving lines not equipped with automatic number identification (ANI) or for calls experiencing ANI failure.

The MF senders (MFS) 13, 17 generate and output MF tone pairs onto the line group data bus 26-1, 44-1 for switching through the time slot interchangers 21 to an outgoing path such as 28-4, 46-4. The MFS 13, 17 communicate directly with system controllers 50, 64 via buses 37, 47, respectively. The MF receivers (MFR) 14, 18 detect MF tones in PCM digital input form and send them to the SC 50, 64 via buses 38, 48, respectively.

The MFS and MFR jointly share one group of 24 D3 time slots and associated control facilities. A minimum of 8 time slots and a maximum of 16 time slots for each sender such as MFS 13 and each receiver such as MFR 14 are available to traffic at any time subject to a total maximum of 24 time slots. Systems with more than one line group may be equipped with the above capacity per line group as required by traffic. Further details of the MF sender and receiver are described in the above-identified application entitled "Multifrequency Sender/Receiver in a Multitime Slot Digital Data Stream."

The primary and secondary system controllers (SC) 50, 64 are Intel 8080A stored program controllers surrounded by a number of peripheral devices and interfaced to each subsystem. The System Controllers provide the following functions:

(1) call processing including routing, ANI (Automatic Number Identification), ONI, recorded announcement control and creation of billing records.

(2) SF self test (3) system test and maintenance data outputs for accumulation of traffic monitoring data and generation of traffic monitoring reports. The secondary (redundant) SC 64 is updated continuously so that it can assume control of the system with a minimum disruption to service should primary SC 50 experience a failure. Further details of the system controller are described in the above-referenced application entitled "A Double Redundant Processor System."

The peripheral devices connected to the System Controllers 50, 64 are as follows:

The CRT 51 which is used for:
 a. Primary system information display (e.g., traffic, alarms, maintenance program results)
 b. Keyboard entry of system control commands and data (e.g., translation table data, trunk-type assignments, test truck control, and system diagnostic control)

The CRT 51 is the primary system interface to office personnel.

Printer 67: provides printed output records of traffic, alarms, maintenance diagnostics and other system data. In the event of CRT 51 maintenance of failure, the printer may be used as a substitute input-output device.

MTR 52: The magnetic tape recorder is the primary system billing recording device. The MTR 52 records can be read by a similar industry standard MTR in an EDP data center.

MTC 53: A magnetic tape cartridge recorder is associated with each SC, primary and secondary. The MTCs are used to load standard programs and office data from tape cartridges. Additionally, the secondary MTC is used as a backup recording device when the MTR is not in service.

RTC 54, 65: The Real-Time Clock generates the stable time bases for timing all programs in each SC 50, 64.

COI 55, 56, 68, 69: Control Office Interfaces are used to interface signals in and out of the CO (e.g., Dynamic Overload Control Signals — DOC).

Office Connection Panel 71: the OCP contains terminal blocks for connection of the system to office alarms, DOC and other office signals as required.

Status and Alarm Panel 70: the SAP provides basic system status and alarm display and allows limited, direct control of essential functions. It communciates with the SC via COIs.

Test Truck Panel 88: the TTP provides jackfields and access to voice and signaling of two 4-wire trunks assigned as system test trunks. Pushbutton switches on the panel allow for talking, dialing and testing on each trunk, for patching together the two test trunks and for momentary monitoring of a call in progress.

ANI Adapter 83 (optional): provides interface facilities between standard local identifiers and the IMAS SC and VB3 trunks.

An example of a call processing overview of the IMAS will be given to provide a better understanding of the operation of the present invention. The overview will be given in conjunction with FIG. 1 and assumes that the primary portion of the IMAS is on-line. The secondary portion of the IMAS is off-line but would automatically be switched on-line should the primary portion experience a failure. Therefore, the description of the call processing overview as it applies to the primary portion of the IMAS will apply with equal effect to the secondary portion.

CALL OVERVIEW

Referring to FIG. 1, a subscriber in a tributary office 90 goes off hook, receives a dial tone from the local office and dials "1" to initiate a 1+ direct distance dialing (DDD) call. This causes a 1+ toll connecting trunk 92 to the IMAS to be seized (go off hook) at the tributary office 90. The seizure is passed into the IMAS through STE/VB3 unit 20 as a change of state of a signaling bit on a T1 line such as 34, 40 entering a T1 I/O interface such as interface 11. The seizure is recognized by the signal processor 72 which passes the change in trunk state to the system controller (SC) 50. The Controller 50 begins a process of building up a Call Processing Record. As the subscriber dials a called number, the signal processor (SP) 72 detects each dialed digit and forwards it to the SC 50 for storage in memory.

At the appropriate time, the Controller 50 signals the tributary office 90 via the SP 72 to initiate calling number identification. The tributary identifier in the tributary office 90 is activated, the SC 50 connects an MF receiver (by assigning the MFR 14 to a time slot corresponding to the time slot occupied by the 1+ originating trunk 92) and the Calling number information is passed to the MFR 14. The MFR 14 forwards each digit received to the SC 50 where this information is assembled in memory with called number and other information necessary to form a complete record for eventual use as a billing record.

With called number information in the memory of the SC 50, the controller 50 proceeds to perform a translation (3 digits or 6 digits as required). An outgoing trunk group connected to Toll Network 91 is chosen and an idle outgoing trunk such as trunk 93 is selected. The digital switch (consisting of line group 10 and time slot interchanger 21 paths) is set up and path tested for path continuity. The MF sender 13 is commanded by the SC 50 to out pulse an MF tone. Alternatively, dial pulse sending (DP) is also possible using the SP 72.

The SP 72 monitors the state of the outgoing trunk 93 after outpulsing and initiates call timing in the SC 50 at answer supervision by using the real time clock 54 associated with the SC 50. The SP 72 continues to monitor the state of the outgoing trunk signaling until the call is terminated. At this point, the SP 72 informs the SC 50 that the subscriber associated with the tributary office 90 went back on hook. The SC 50 then assembles a billing record in its output memory buffer area. When a block of 16 billing records is present in the buffer area, it is written on the output magnetic tape recorder (MTR) 52.

The information contained in a call record is: the date; connecting time; elapsed time in minutes and seconds; originating number; terminating number; type code; class code; information code; time and charge code; trouble code; CPFR code; incoming trunk ID; outgoing trunk ID; and toll center number.

Referring to FIG. 5, the input portion of the T1 I/O interface 11 of FIG. 1 accepts serial bipolar PCM data from a T1 line 35 carrying information in D3 format. Each time slot of incoming data comprises 8 bits of PCM sampled data so that there are 192 bits for 24 channels per T1 line plus one framing bit. Incoming data is stored and synchronized to the IMAS system frame. Serial data is converted to 9 bit parallel (8 bits data plus parity bit) and sent to the time slot interchanger (TSI). Carrier group alarm (CGA) detection (Bit 2=0) and signal bit recovery (Bit 8 of 6th and 12th frames) is also accomplished. Error signals and signal bits are sent to the signal processor for further analysis.

It is possible to operate 16 of these interfaces per line group. Each interface accommodates one T1 line or VB3 voice bank. Up to 4 line groups per system may be used.

Incoming PCM data on Bus 35 from the unit 20 is converted to normal TTL levels by a conventional Unipolar Converter 102 and gated through the conventional Data Select 131 on Bus 103 by an Active signal applied to the line group in response to the Master Clock 78 under control of the system controller 50 of FIG. 1.

The Master Clock 78 provides the necessary timing signals to the Input Timing Generator (ITG) 129 via bus 60. The ITG 129 includes conventional counters and logic to distribute common miscellaneous timing functions to the various subsystems of the I/O Input Interface of FIG. 5. The conventional Clock Recovery circuit 110 receives the PCM data and reconstitutes a clock signal to provide a clocking edge that lags the data bit by one quarter period of the square wave period. Data is loaded from Data Select 104 into a holding buffer in the Elastic Store 106, a 256 bit store, via bus 105 until the next available write window from the Read/Write Control (RWC) 120. The Read/Write Control 120, a typical selector circuit to insure there is no interference between read and write times, then gates the Write Address Counter 118 through a conventional Address Select Circuit 129 to the Elastic Store 106 and writes the data bit at this address location on a 256 × 1 bit RAM. The Write Address Counter 118 is 8 bits wide (to address 192 bits of data per T1 line) and free running at 1.544 MHz. Since the system clock has a basic frequency of 3.088 MHz, it will have 2 rising edges per incoming data bit; thus there are two available write windows per incoming bit to assure that each bit will be written in the Elastic Store 106 regardless of the phase or jitter of the recovered incoming clock with respect to the master clock timing of the ITG 129.

When the line group is not active, data from the output interface of FIG. 6 is looped around through Data Select 104 of FIG. 5 via Bus 199. This allows off line checking of a line group to be sure that it is ready for service, the details of which are more fully described in the above-identified application entitled "Service Generator Checking Apparatus And Method."

The Reframe Control Circuit 144 controls the state of the Read Address Counter 154, and clocks the appropriate data bit from the Elastic Store 106 into the Serial To Parallel Converter 136 via Bus 132. Converter 136 is a conventional shift register. When the 8 bit word (D3 format) of a T1 channel is present in the Serial To Parallel Converter 136, it is clocked into the Output Buffer 140 via 8-Bit Bus 138 by the ITG 129 along with a parity bit from Parity Generator 134 computed at the input to the Serial To Parallel Converter 136. ITG 129 then sequentially connects this output buffer 140 in its turn with 15 other input interface circuits of the FIG. 5 type to the TSI bus 26-1 through Line Driver 143 and bus 24-1 to the TSI of FIG. 7. TSI bus 26-1 is a conventional three-state bus that is accessed by the other 15 T1 input interfaces in their turn to form 384 (16 × 24 D3 channels) time slots. The 16 input interface circuits each with their 24 T1 channels (D3 format) form the 384 (16 × 24) channels per line group.

Once per frame, the Reframe Control 144 compares the frame bit at the appropriate position in the Serial To Parallel Converter 136 with its own frame code generator. If two or more errors in four frames occur, a reframe mode is initiated. Reframing is accomplished by adjusting the delay through the Elastic Store 106. A frame error signal apprears on bus 147 for transmission of SP 72 of FIG. 1 via bus 73-1.

The Reframe Control 144 includes a comparator, four frame counter and processor, which includes a PROM and data selector. A group of data bits in the vicinity of the system frame bit time is inspected for potential frame bits. Each bit position is checked until it either produces the correct framing sequence for 10 frames or one error in a potential sequence is detected. When the entire group has been checked and no frame code sequence has been found, the Read Address Counter 154 is advanced to select the next group of bits. This process continues until the above mentioned framing sequence is found. The "found" bit position is synchronized with the system frame bit position by delaying the Read Address Counter 154 and a framed condition is reestablished.

An exemplary flow chart for describing the operation of the processor contained within the reframe control is shown in FIG. 14. The processor of reframe control 144 will execute the following steps for finding the framing bit for the line group.

In FIGS. 3 and 4, the frame bit position shown occurs once at the start of each frame. It contains a framing code that takes 12 frames to repeat.

Referring to FIG. 14, steps 0, 1, 2, 3 and 5 are executed in a sequence when the reframe control 144 is in a framed condition. The read address counter 154 and converter 136 of FIG. 5 are continuously being clocked once per incoming bit. Thus the read address counter 154 keeps pace with the write address counter 118.

The processor will wait at step 0 until IFC (input frame control) decision sends it to step 1. IFC is a typical signal from the ITG 129 of FIG. 5, which occurs one D3 time slot after the frame bit. If IFC is no, the processor returns to step 0. If IFC is yes, the processor proceeds to step 1.

At step 1, the frame code generator/comparator (internal to the reframe control 144) is clocked to keep its internal frame bit up to date. In addition, the Address Counter 154 and Converter 136 of FIG. 5 are incremented as in step 0.

At this point the incoming frame bit FB is compared with the internal frame bit. Assuming the four frame counter is at frame 0, if no code error is detected (CE=OF) the processor will continue to step 2 and clock the address counter 154 and converter 136 of FIG. 5.

From step 2, the processor goes to step 3 if the four frame counter is at frame zero in its count where the four frame counter is kept reset and a reframe flag is lowered. Lowering the reframe flag will apply the appropriate flag state to the most significant bit of the four frame counter when being loaded.

The processor returns then to step 0 and repeats the cycle.

In step 1, if the frame code generator does detect a code error, at frame zero or no code error at frames 1, 2, or 3 (CE=OF is a yes condition), the processor branches to step 5 where the four frame counter is incremented to the next state. The cycle repeats until the four frame counter returns to 0 or another code error occurs. A second error in four frames causes the reframe mode to be entered at step 12 via step 2.

At step 12, the reframe flag is raised when the four frame counter is reset. Raising the reframe flag applies the appropriate reframe flag stage to the most significant bit (MSB) of the four frame counter when being loaded. Also, the read address counter 154 of FIG. 5 is advanced 8 counts with respect to the write address. For 3 consecutive frames, the 8 bits in this frame position are loaded into converter 136. This is accomplished in steps 13, 14 and 9 and is controlled by decision IRL (input reframe load) and the four frame counter of reframe control 144. IRL is another timing signal from ITG 129 of FIG. 5.

When the four frame counter returns to frame 0, the processor branches from the load loop to state 15. At this point the 4th set of 8 bits together with the three previous sets of 8 bits form 8 4-bit words that are clocked into the frame code generator and inspected one at a time for any of the twelve codes shown in FIG. 3. If one is found, the code compare (CC) indicates that a potential frame code sequence has been found and the processor goes to step 6. If no valid code is found the processor branches to step 6 after the 8th word has been inspected.

Referring to FIG. 14, at step 6, the processor checks CC to see if it has terminated the search mode. If not the processor jumps back to step 12 to repeat the process for the next 8 bits in the frame. If CC is a yes, then the sync mode is entered at step 7.

In steps 7 and 8, the four frame counter is set to zero to prepare for the check mode, and the position of the found code is synchronized to the system frame bit position by decision IAS (input address sync), a timing signal from ITG 129 of FIG 5.

Steps 10, 11 and 4 are the check mode in which the processor inspects the FB position in the normal manner for 3 more frames, after rechecking the found bit. Decision CE (code error) indicates that the incoming frame bit is not equal to the frame code generator bit. If CE is yes, it will cause the processor to jump back to step 12 to repeat the process. Otherwise the four frame counter returns to 0 and the processor branches to step 5. Three more FB positions are checked for error with a single error causing a return to step 12 via step 2.

After 10 consecutive FB positions containing no errors have occurred, the processor restores a framed condition at step 3.

FIG. 5, signal bits are written into the Signal Bit Store 150, a 32 × 4 bit RAM, during frames 6 and 12, as determined by the internal frame code generator of the Reframe Control 144 from the appropriate output of the Serial to Parallel Converter 136. Since the Reframe Control 144 synchronizes the incoming frame bit to the nearest system frame bit position, the incoming frame number bears no relation to the current system frame number. Therefore, signal bits from the Signal Bit Store 150 are allowed to stay on line for 12 consecutive frames to be sure they are valid during the system signaling frames.

During normal operation, the second bit position (next to the most significant bit) in all 24 words is inspected by conventional Detector 148. If all 24 bits are zero, than a B2=0 signal appears on bus 149 which is sent to SP 72 of FIG. 1 via Bus 73-1.

The B2= means that all 24 bit 2 positions in one frame (D3 format) are 0. This is a carrier group alarm (CGA) sent by the associated D3 equipment. The framing error has priority over the B2=0 error.

Signal bits, B2=0 error signals, and framing errors are applied to the SP bus 73-1 and sent to the SP in the same manner as data sent to the TSI. These signals are processed and relayed to the System Controller to give trunk status information.

Path tests are performed to insure that the particular path is or is not set up through the TSI. The Path Test Generator (PTG 156) receives a command from the SP via bus 73-2 to invert the parity bit of the channel under test. The parity is inverted at line driver 143. Parity checking of all output interfaces discloses the results of the path test. Further details of the path test are described in the above-identified application entitled "Path Test Apparatus and Method."

Referring to FIG. 6, the output interface accepts data from the TSI and Signal Processor (SP) in parallel form. It is converted to a serial format and then to bipolar PCM to be applied to the T1 line. During signaling frames, signal bits from SP are inserted at the appropriate place in the parallel word. The signaling frames in the IMAS are frames 6 and 12 with the 8th bit of each channel time slot allocated for a signal bit to indicate on-hook or off-hook status. Also, a zero suppression circuit maintains at least a 1 out of 16 pulse density on the T1 line. The zero suppress circuit monitors all 8 bits being applied to the parallel to serial converter. If all 8 bits are 0, Bit 7 is forced to a 1. This insures that no more than 15 consecutive zeros will appear in a T1 stream, a condition necessary to keep clock recovery circuits alive. A parity check is made of all data. Parity errors are sent to the signal processor for analysis.

It is possible to operate 16 of these interfaces per line group. Each interface accommodates 1 T1 line or VB3 voice bank. Up to four line groups per system may be used.

Referring to FIG. 6, the output portion of the I/O Interface 11 of FIG. 1 is shown in more detail. Data from the TS1 is applied to the conventional Input Buffer 167 via Line Receiver 165 and buses 28-1, 30-1.

The Output Timing Generator (OTG) 196 loads Input Buffer 167 whenever an outgoing PCM word appears on the bus 30-1. The OTG 196 is similar to the ITG 129 of FIG. 5. When 16 words have been loaded (1 word in each buffer for up to 16 interfaces), the conventional Parallel to Serial Converter 171 in all of the interfaces is loaded with this data. The serial data immediately starts shifting out on the T1 line 41 via the Bipolar Converter 179 and the T1 Line Driver 181. The Active signal from Master Clock 78 of FIG. 1 controls a pair of relays that connect the T1 Line Driver to the T1 line. The primary and secondary interfaces are connected in parallel at the T1 line. Therefore the off-line driver is disconnected by the relays.

During system frames 6 and 12, signal bits are inserted at Bit 8 via the Signal Select 175, which is similar to data select 104 of FIG. 5. In FIG. 6, signal bits are received from the signal processor via bus 73-3, 192 and line Receiver 191, and are loaded with parity in the same manner as data from the TSI. Bus 73-3 corresponds to Bus 73 of FIG. 1.

In FIG. 6, the Zero Suppress circuit 174 is a comparator circuit that monitors all 8 bits being applied to the Parallel To Serial converter 171. If bits 1-6 and 8 are 0, Bit 7 is forced to a 1. This insures that no more than 15 consecutive zeros will appear in a T1 stream, a condition necessary to keep clock recovery circuits alive.

The conventional Parity Checker 184 is preset to its start state at the beginning of each serial word. The preset state is determined by monitoring data parity, signal parity if frames 6 or 12, and the Zero Suppress circuit 174. The Parity Checker 184 computes parity on the serial word as it is applied to the input of the T1 Line Driver 181. The proper parity error condition exists at the end of the serial word and is loaded into the Parity Muxer 186 along with the 15 other parity error conditions. The Parity Muxer 186 sends the 384 channels of parity error data per frame to the Signal Processor 72 of FIG. 1 via Line Driver 188 and buses 187, 73-2. Bus 73-2 corresponds to Bus 73 of FIG. 1.

In FIG. 6, the frame bit is always applied to the serial input of the Converter 171. The OTG 196 only allows the frame bit to shift through to the output at the appropriate frame bit time.

When a line group is off line, the Active signal will select data from the Bipolar Converter 179 instead of data from the Unipolar Converter of the T1 input interface of FIG. 5. This allows a loop around test to be performed by the Service Generator (SG) 22 of FIG. 1. The T1 input interface frames up on the serial T1 stream from the output section allowing TSI output bus data to be looped around to the TSI input bus. Further details of the loop around test are described in the above-identified application entitled "Service Generator Checking Apparatus and Method."

Referring to FIG. 7, the timed division multiplexed PCM digital switch network configuration used in the IMAS is shown. The digital switch comprises line groups 0–3 and TSI 0–3 of FIG. 1. Network paths have been derived by multiplexing together 16 24-channel T1 lines in a line group to form 16 × 24 or 384 time division channels or time slots. In a full size IMAS there are 4 line groups 10 for a total of 1536 terminations or channels. Each line group has primary and secondary redundancy as previously described, but not shown here. The channels appear sequentially on the horizontal input paths 26-1 to 26-4 of the network and are switched to the desired outgoing paths 28-1 to 28-4 by the time slot interchanger TSI $\phi$-3, associated with the vertical paths 208-1 to 214-4 of the network.

As an example, assume a call is in progress from LG0 to LG1 through TSI O. In operation, under control of the System Controller 50, an originating channel sample from one of the T1 lines is multiplexed out on a horizontal path such as path 26-1 as one of 384 time slots for the group. The data is switched to a vertical path such as 210-1 to TSI O. The TSI O transfers the sample to its memory, where it is held until the terminating channel time slot in the next frame appears, whereupon the sample is transferred back on path 208-1 and switched to a path such as 28-2 to the line group LG1 and the T1 line on the terminating channel. Further details of the TSI are described in the above-identified application entitled "Time Slot Interchanger."

Referring to FIG. 9, the service generator (SG) 22 of FIG. 1 provides the capability of connecting one of several tones to any of the 1536 channels in an integrated message accounting system (IMAS) as shown in FIG. 1. These tones, including 1,000 Hz, 120 IPM busy, 60 IPM busy, dial tone, ring back tone, and certain codes used internally by the IMAS, are all digitally synthesized by the SG 22 under command from the system controller (SC) 50.

In FIG. 9, a portion of the primary service generator (SG) 22 of FIG. 1 is shown in more detail. The description of the secondary SG 23 would be identical.

SG 22 includes control 301 connected to receive signals from master clock 78 of FIG. 1. Control 301 is shown in more detail in FIG. 10.

In FIG. 9, the SG 22 includes control 301, matrix 302 (1 per line group), function generator 303 (up to 4 per IMAS), SG checker 304, SG checker interface 305 (1 per line group), and system controller interface 335. The interconnections of the various components of FIG. 9 will be described in more detail in conjunction with FIGS. 10, 11, 12 and 13.

In FIG. 9, system controller interface 335 is an universal asynchronous receiver/transmitter (UART) connected to communicate with the primary system controller (SC) 50 via buses 57-1, 57-2, which correspond to bus 57 of FIG. 1. Interface 335 is shown in more detail in FIG. 13.

The service generator checker 304 includes a universal asynchronous receiver/transmitter (UART) for communicating with SC 50 of FIG. 1. Upon request from the SC via bus 57-4, the checker 304 sends 65 consecutive bytes of PCM data from the selected line group to SC 50 via bus 57-3.

Checker interface 305 connects the output data bus 28-1 to checker 304 via bus 348. Interface 305 includes conventional differential receivers and tristate drivers to forward data to checker 304. Checker 304 is connected to checker interface 305 via bus 350. Other interfaces (up to four interfaces in a full size IMAS) would be connected to checker 304 via bus 351, 349.

The function generator 303 is shown in more detail in FIG. 12. The matrix 302 is shown in more detail in FIG. 11.

Referring now to FIG. 10, the SG Control 301 includes Frame Pulse Generator 307, Address Generator 308, Signaling Frame Detector 309, and Power Up Reset Circuit 310.

The Frame Pulse Generator 307 is a typical pulse generator that uses signals FS1 and MCLK1 of FIG. 8 to generate the FPL pulse signal on Bus 357. The FS1 signal is a 648 ns pulse that occurs every 125 us. MCLK1 ($\phi$1) is a 3.088 MHz square wave. FPL is a clock signal that goes low for 324 ns and repeats every 125 us, marking the start of a new frame. Each frame is divided into 386 channels corresponding to the 384 channels in the IMA plus 2 channel times used by the framing pulse. The FPL pulse is primarily used to reset the Address Generator 308 to zero.

The Address Generator 308 of FIG. 10 is used to identify the 386 different channel times in each frame on Bus 358 by binary address lines 1, 2, 4, 8, 16, 32, 64, 128 and 256, and is primarily used to address random access memories on the Service Generator Matrix 302 to be discussed subsequently. The Address Generator 308 is a conventional 11-bit binary counter which uses 9 bits to count sequentially from 0 to 385. A parity generator is used for output AP, which is the odd parity of the 9 address lines. Outputs GRP EN 1 and 2 on Bus 359 are higher order bits of Generator 308 used to enable certain functions in the Service Generator Matrix 302 of FIG. 11. They enable one of the 4 possible service generator matrices (in a full system with four Line Groups) in sequence.

WRITE AD is used by Tone Buffer 321 of FIG. 11 for writing tone sample data into the proper location. In FIG. 10, the Signaling Frame Detector 309 is a conventional 4-bit shift register and decoder which produces a signal SFL on Bus 367 to identify the two signaling frames in the D3 frame pattern, which are normally frames 6 and 12. The SFL signal is used to identify the frame immediately following the two signal frames, which are frames 7 and 1.

Referring to the Power Up Reset Circuit 310, when power is first applied to the SG, or any circuit is plugged in, the Power Up Reset Circuit is a conventional pulse generator which generates on bus 368 a pulse PWR CLR of at least 125 ns, from an FPL pulse to the next occurrence of the FPL pulse, This is to insure that all RAM memory locations for all channels are initialized.

In FIG. 9, in communicating with the SG, the System Controller 50 of FIG. 1 sends 3 bytes to the SG Interface 335 via Bus 57-2, the format of which is set forth in Chart I.

Chart I

| | 7 | 6 | 5 | 4 | 3 | 2 | 1 | $\phi$ | |
|---|---|---|---|---|---|---|---|---|---|
| byte 1 | X | X | X | X | X | X | X | X | low order channel # |
| byte 2 | | | | | | | | X | high order channel # |
| " | | | | X | X | X | X | | tone # |
| " | | | | | | | | | line group # |
| " | | X | | | | | | | parity of tone & ch # |
| byte 3 | complement of byte 2 | | | | | | | | |

The Service Generator sends a one byte reply via bus 57-1 as set forth in Chart II.

Chart II

| 7 | 6 | 5 | 4 | 3 | 2 | 1 | $\phi$ | |
|---|---|---|---|---|---|---|---|---|
| | | | | | | | X | memory parity error LG$\phi$ |
| | | | | | | X | | memory parity error LG1 |
| | | | | | X | | | memory parity error LG2 |
| | | | | X | | | | memory parity error LG3 |
| | X | | | | | | | time out job not done |
| X | | | | | | | | parity error in message rcvd |
| | | X | | | | | | loop around test fail |

When 3 bytes have been received, the SG waits until the Address Generator 308 of FIG. 10 counts up to the address received from the System Conroller 50. At that time the tone number received is written into the Channel Memory 320 located on the Service Generator Matrix 302 of the selected line group, which will be discussed subsequently. Simultaneously, a reply is sent to the System Controller. As can be seen, byte 1 and the low order bit 0 of byte 2 from the System Controller will indicate which of the 384 IMAS channels is to receive data from the SC. Bits 1 and 2 of byte 2 indicate which line group of the 4 line groups will receive the data. The particular tone to be sent is identified by bits 3-6 of byte 2 (1 of 16 tones), and bit 7 of byte 2 indicates the odd parity of the tone and channel numbers. Byte 3 is a complement of byte 2 which is compared by the SG to see if it is the exact complement of the second byte. The SG reply is the 1 byte message as set forth above.

Referring to FIG. 13, the SC Interface 335 of FIG. 9 is shown in more detail.

SC Interface 335 includes a conventional universal asynchronous receiver/transmitter (UART) comprising receiver 390, transmitter 391, and a UART clock generator 392.

Receiver 390 receives instructions from the system controller via bus 57-1 and address inputs 1-256 on bus 358 from the address generator 308 of FIG. 10.

UART clock generator 392 is a 5 MGz crystal oscillator and includes a decade counter to divide the frequency down to 500 KHz, which is used by receiver 390. Generator 392 provides a 62.5 MHz signal to transmitter 391.

Outputs of receiver 390 are FCT 1 - FCT 4, FCTP on bus 382, GRP SEL 1 and 2, on Bus 383, WRITE EN on bus 384, Dial Tone Load on bus 385. FCT 1 - FCT 4 identify which of the tones (1 of up to 16) are to be transmitted. FCTP is the odd parity FCT 1 - FCT 4. FCT 1 - FCTP are applied to channel memory 320 of FIG. 11. Signals GRP SEL 1 and 2 selectively enable one of four possible matrices like Matrix 302 of FIG. 9 in a full size IMAS. Signal WRITE EN is applied to memory 320 of FIG. 11. The Dial Tone Load signal is a control signal used by the Matrix 302 of FIG. 11.

When receiver 390 has received three bytes from system controller 50 of FIG. 1 in the format as previously described, the receiver waits for address generator 308 of FIG. 10 to reach the address of the channel number received from the system controller. As soon as this occurs, the WRITE EN signal and FCT 1 - FCT 4 are written into the channel memory 320 of FIG. 11, as will be described subsequently. The particular matrix 302 of FIG. 11 is selected by GRP SEL 1 and 2 signals on bus 383.

Receiver 390 signals transmitter 391 by retransmit signal on bus 393 if an overrun, framing or parity error is detected by the UART during reception of the 3 bytes. If all three bytes have not been received within approximately 16 ms, the receiver 390 signals transmitter 391 via time out signal on bus 381.

When the receiver is finished, a 1 byte reply is sent to the system controller as previously described. Transmitter 391 sends the signal via bus 57-2 to the system controller 50 of FIG. 1. Transmitter 391 also receives loop around signal on bus 372 from Matrix 302 of FIG. 11. Also, transmitter 391 receives a PE signal on bus 342 from the Matrix 302 of FIG. 11.

Referring now to FIG. 11, the Channel Memory 320 is a 386 × 5 RAM, the 386 locations corresponding to the 386 channel times of a line group. These locations are addressed sequentially through address inputs 1, 2, 4, 8, 16, 32, 64, 128 and 256, originating from the Address Generator 308 in the SG Control of FIG. 10.

Channel Memory 320 utilizes signals Address 1–256, AP, and $\phi1$ from SG Control 301 of FIG. 10, and signals FCT 1 – P, and WRITE EN, an enabling signal, from SG Interface 335 of FIG. 13.

The SG Matrix 302 of FIG. 11 connects any one of 15 tones or an idle code to any one of the 384 channels in a line group. The SG Matrix also contains loop around circuitry which is described in more detail in the above-identified application entitled "Service Generator Time Slot Checking."

When the SG Interface 335 of FIG. 9 receives a message from the System Controller to connect a tone to a particular channel, the tone number is stored in FIG. 11 in the Channel Memory 320 via signal FCT1-4 at the location for that channel. FCT1-4 is a signal having 16 possible states for identifying 15 tones or an idle code.

As the Address Generator 308 of FIG. 10 sequences through all the channel numbers, the tone number assigned to these channels appears at the Channel Memory 320 as signals FCT1-4 from SC Interface 335 of FIG. 13. The data present on the FCT1-4 is written into the selected memory location. The signal FCT1-4 corresponds to bits 3-6 of byte 2 sent from the System Controller as previously described.

For example, assume the System Controller 50 of FIG. 1 tells the Service Generator 22 to connect dial tone to channel 123. The code for dial tone is 15, which in FIG. 11 is stored at location 123 of the Channel Memory 320 via signal FCT1-4. From there on, every time channel 123 is addressed, "15" appears on the Channel Memory. This "15" is used to address location 15 in the Tone Buffer 321 via bus 346. The output of the Tone Buffer 321, to be described subsequently, is connected to the data bus 322.

The Tone Buffer 321, a 16 × 10 bit RAM is a temporary storage for the PCM tone data. At certain times during the address cycle, each location is updated.

Referring to FIG. 12, the Function Generator 303 generates all tones and special codes used in the IMAS. Each Function Generator 303 of FIG. 12 type can handle up to 4 different tones or codes. A Service Generator 22 as in FIG. 9 in a full size IMAS can accommodate up to 4 Function Generators. Tones are stored in PCM format which are read out once per frame under the control of the SG Control 301 and the data is transferred to the Service Generator Matrix 302 of FIG. 11.

In FIG. 12, the tones are produced by Tone Generators 326–329, each including 3 PROMs and 2 binary 4-bit counters. At the beginning of each frame, the counters are toggled by signal FPL from the Frame Pulse Generator of FIG. 10 and they will either advance one count or reset under control of the PROMs. Each Tone Generator 326–329 has a 12-bit output on buses 401–404, which are reset control (not shown), A, B, data parity, and data 0-7.

The outputs of the PROMs are a series of samples of PCM encoded voltage levels. When these series of samples are cyclically read out, a continuous tone is generated, using a minimum number of samples. The size of the PROMs in the tone generator will contain no more than 256 samples. Because all frequencies used by the IMAS do not have less than 256 samples to generate a continuous tone, the frequencies were varied within allowable variations. For example, the American Telephone and Telegraph Company allows ±0.5% variation and the following Chart III sets forth the variations used for the digital milliwatt tone (MW), dial tone (DT), ring back tone (RBT), and trunk busy (120 IPM).

Chart III

| Tone | Frequency | % Error | No. of Samples |
|---|---|---|---|
| MW | 1000 Hz | 0% | 8 |
| DT | 351.648,439.56 | +.4709%, −.1% | 91 |
| RBT | 440,480 | 0% | 200 |
| 120 IPM | 480.687,618.026 | +.143%, −.318% | 233 |

The reset control signal causes the counters to reset when they address the last programmed and all unprogrammed locations in the PROMs. Outputs A and B indicate an interruption rate. They are used to select 2 second on/4 second off, 60 interruptions per minute (IPM), 120 IPM, or no interruption. The select functions of A and B are

| A | B | Function |
|---|---|---|
| 0 | 0 | 2 second on, 4 second off |
| 1 | 0 | 60 IPM |
| 0 | 1 | 120 IPM |
| 1 | 1 | always on |

Data parity P is the odd parity of data 0-7.

Except for the PROM contents, each of the 4 Tone Generators of FIG. 12 operates in identical fashion. The counters initially address location 0 of the PROM. The data contained at this location is forwarded to the Tone Multiplexer 331 and the Interruption Controller 332 over leads A, B, P, 0-7. At the next occurrence of the FPL pulse on bus 357, the counters advance to 1 and the data at that location in the PROMs is addressed. The FPL pulse occurs once per frame or once every 125 us. The counters advance with each pulse until a location is encountered where the PROM is unprogrammed. The next SPL pulse now resets the counters to 0, and the cycle repeats.

The Interruption Controller 332 includes 3 decade counters and 2 hexidecimal counters advanced every 125 us. The output consists of three square waves, which are a 60 IPM square wave on bus 395, a 120 IPM square wave on bus 394, and a 2 second on/4 second off square wave on bus 396. These outputs are used to gate interrupted tones on the output data bus 341, under the control of the Tone Generator outputs A and B previously described.

The Tone Multiplexer 331 is a conventional 4 to 1 multiplexer which gates the multiplexed tones onto the common data bus 341 sequentially. They are then stored in the Tone Buffer 321 of FIG. 11. Multiplexer 331 is addressed by signals Address 2, 4, 16, 256 on bus 358 which enable the particular function generator 303 (one of four in a full system) and the particular tone generator within a function generator (one of four).

As previously described, the Tone Buffer 321 in FIG. 11 is a 16 × 10 RAM. The 16 10-bit locations correspond to the 16 maximum tones for a full size IMAS. The Tone Buffer 321 is updated once per frame by the Tone Multiplexer 331 of FIG. 12. The WRITE AD signal on bus 386 enables the PCM data on bus 341 to be loaded into a location in the Tone Buffer 321.

The Matrix Control 323 connects the tone data appearing on the Tone Buffer Bus 322 to the data bus 324 and to the proper channel on the line group. Matrix Control 323 is a typical circuit including parity generator, differential drivers and latches for outputting data onto bus 28-1. The combination of φ1, Data 0-7 and FCTL-4 signal will enable the control 323 to output data on Bus 28-1.

Another function of the Service Generator is to check the data bus and line group of the off-line system. This is accomplished by a loop-around test. Data is sent out on the data bus and comes back on a receiver bus, one frame later.

What is claimed is:

1. In a telephone system having an interface including an input portion connected to an input bus for receiving input telephone signals, an output portion connected to an output bus for transmitting output telephone signals, and time slot interchanger means for connecting said input bus to said output bus whereby said input signals become output signals, said system operating with the telephone signals in time frames each consisting of a plurality of time slots, a service generator comprising:

tone generator means for generating, each time frame, pulse code modulated tone samples for a plurality of tones, tone multiplexer means for multiplexing said tone samples onto a common bus each time frame, service generator matrix means connected directly from said common bus to said output bus so as to bypass said time slot interchanger means to connect selected ones of said tone samples to said time slots in each frame on said output bus, and service generator control means, connected to control said matrix means, for specifying said selected ones of said tone samples and for specifying said selected time slots on said output bus.

2. A system as in claim 1 wherein said matrix means includes tone buffer means for storing, during each time frame, a pulse code modulated sample from said multiplexer means for each of said plurality of tones.

3. A system as in claim 2 wherein said matrix means includes channel memory means for storing at locations corresponding to said selected time slots said selected ones of said tones.

4. A system as in claim 3 wherein said control means includes address generator means for addressing said channel memory means at said locations whereby said channel memory means addresses said tone buffer means at the location where the specified tone is stored.

5. A system as in claim 1 wherein said tone generator means inlcudes a memory for storing a number of pulse code modulated samples substantially representing a particular one of said plurality of tones and a counter incrementable once each frame for sequentially reading out from an initial count said pulse code modulates samples from said memory where said counter counts to a number corresponding to the number of samples stored in said memory whereupon said counter resets to said initial count.

6. A system as in claim 5 wherein said control means includes frame pulse generator means for incrementing said counter once each frame.

7. A system as in claim 5 wherein said memory includes a programmable read only memory for storing said samples representing a particular tone.

8. In a telephone system operating in time frames each consisting of a plurality of time slots, a service generator comprising, tone generator means for generating, each time frame, pulse code modulated tone samples for a plurality of tones, tone multiplexer means for multiplexing said tone samples onto a common bus each time frame, matrix means, connected to said common bus, for connecting selected ones of said tone samples to selected time slots in each frame, control means, connected to control said matrix means, for specifying said selected ones of said tone samples and for specifying said selected time slots, said tone generator means including a memory for storing a number of pulse code modulated samples substantially representing a particular one of said plurality of tones and a counter incrementable once each frame for sequentially reading out from an initial count said pulse code modulated samples from said memory where said counter counts to a number corresponding to the number of samples stored in said memory whereupon said counter resets to said initial count, wherein said memory includes a programable read only memory for storing said sample representing a particular tone, and interruption controller means for gating a selected interrupted tone sample from said tone multiplexer means, means for storing interruption bits associated with each of said samples specifying a selected interruption time for a tone whereby said controller means gates said tone sample onto said common bus at said selected interruption time.

9. A pulse code modulated integrated message accounting system having an interface including an input portion connected to an input bus for receiving input telephone signals, an output portion connected to an output bus for transmitting output telephone signals, and time slot interchanger means for connecting said input bus to said output bus whereby said input signals become output signals, said system operating with the telephone signals in time frames each consisting of a plurality of time slots, comprising:

system controller means for specifying selected ones of pulse code modulated tone samples and for specifying selected time slots, and a service generator including tone generator means for generating, each time frame, pulse code modulated tones samples for a plurality of tones, tone multiplexer means for multiplexing said tone samples onto a common bus each time frame, service generator matrix means, connected directly from said common bus to said output bus so as to bypass said time slot interchanger means to connect selected ones of said tone samples to selected time slots in each frame on said output bus, and service generator control means, responsive to said system controller means, connected to control said matrix means.

10. A system as in claim 9 wherein said control means includes system controller interface means connected to said system controller means for providing a signal to said matrix means representing a selected one of said samples specified by said system controller means.

11. A system as in claim 10 wherein said matrix means includes tone buffer means for storing during each time frame a pulse code modulated sample from said multiplexer means for each of said plurality of tones.

12. A system as in claim 11 wherein said matrix means includes control memory means for storing at locations corresponding to the specified time slot said signal representing said selected tone.

13. A system as in claim 12 wherein said control means includes address generator means for addressing said channel memory means at said locations whereby said channel memory means addresses said tone buffer means at the location where a specified tone is stored.

14. A system as in claim 13 wherein said tone generator means includes a programmable read only memory for storing a number of pulse code modulated samples substantially representing a particular one of said plurality of tones and a counter incrementable once each frame for sequentially reading out from an initial count said pulse code modulated samples from said memory where said counter counts to a number corresponding to the number of samples stored in said memory whereupon said counter resets to said initial count.

15. A system as in claim 14 wherein said control means includes frame pulse generator means for incrementing said counter once each frame.

16. A pulse code modulated integrated message accounting system operating in time frames each consisting of a plurality of time slots, comprising:
   system controller means for specifying selected ones of pulse code modulated tone samples and for specifying selected time slots, and
   a service generator including,
   tone generator means for generating each time frame pulse code modulated tone samples for a plurality of tones,
   tone multiplexer means for multiplexing said tone samples onto a common bus each time frame,
   matrix means connected to said common bus for connecting selected ones of said tone samples to selected time slots in each frame, and
   control means, responsive to said system controller means, connected to control said matrix means, said control means including system controller interface means connected to said system controller means for providing a signal to said matrix means representing a selected said one of said samples specified by said system controller means,
   said matrix means including tone buffer means for storing each time frame a pulse code modulated sample from said multiplexer means for each of said plurality of tones, control member means for storing at locations corresponding to the specified time slot said signal representing said selected tone,
   said control means including address generator means for addressing said channel memory means at said locations whereby said channel memory means addressing said tone buffer means at the location where a specified tone is stored,
   said tone generator means including a programable read only memory for storing a number of pulse code modulated samples substantially representing a particular one of said plurality of tones and a counter incrementable once each frame for sequentially reading out from an initial count said pulse code modulated samples from said memory where said counter counts to a number corresponding to the number of samples stored in said memory whereupon said counter resets to said initial count, and
   interruption controller means for gating a selected interrupted tone sample from said tone multiplexer means, means for storing interruption bits associated with each of said samples specifying a selected interruption time for a tone whereby said controller means gate said tone sample onto said common bus at said selected interruption time.

17. In a telephone system having an interface including an input portion connected to an input bus for receiving input telephone signals, an output portion connected to an output bus for transmitting output telephone signals, and time slot interchanger means for connecting said input bus to said output bus whereby said input signals become output signals, said system operating with the telephone signals in time frames each consisting of a plurality of time slots, a method of generating a plurality of tones comprising the steps of:
   generating, each time frame, pulse code modulated tone samples for a plurality of tones,
   multiplexing said tone samples onto a common bus each time frame,
   connecting selected ones of said tone samples to selected time slots in each frame directly to said output bus so as to bypass said time slot interchanger means, and
   specifying said selected ones of said tone samples and specifying said selected tine slots on said output bus.

* * * * *